Aug. 27, 1957
E. WEBER
2,804,319
LUGGED CONDUIT COUPLING DEVICE WITH LATCH SLEEVE MANIPULATOR
Filed Dec. 13, 1954
3 Sheets-Sheet 1
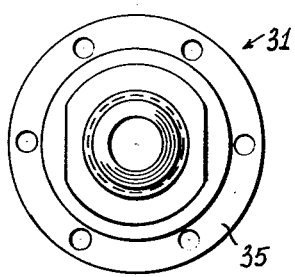
FIG.2.
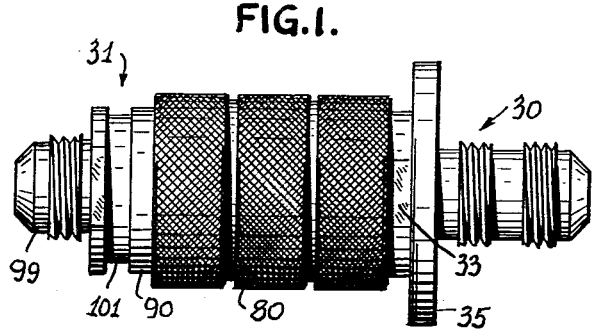
FIG.1.
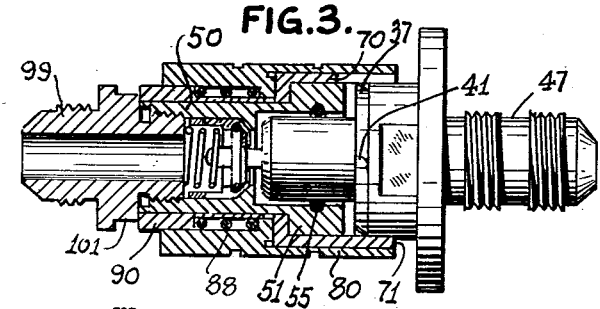
FIG.3.
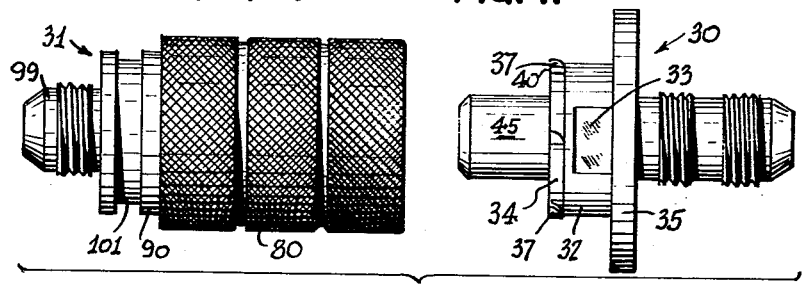
FIG.6. FIG.5. FIG.4.
FIG.7.
INVENTOR.
EMMERICH WEBER
BY
Perce Freeman
ATTORNEY.

Aug. 27, 1957 E. WEBER 2,804,319
LUGGED CONDUIT COUPLING DEVICE WITH LATCH
SLEEVE MANIPULATOR
Filed Dec. 13, 1954 3 Sheets-Sheet 2
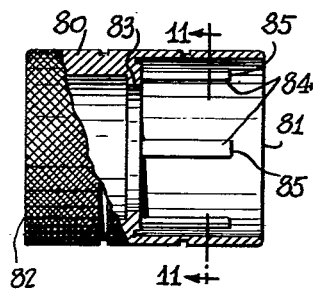
FIG. 10.
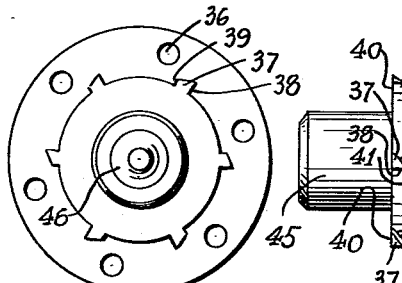
FIG. 9.
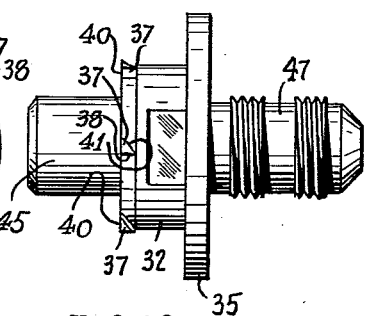
FIG. 8.
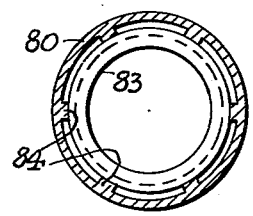
FIG. 11.
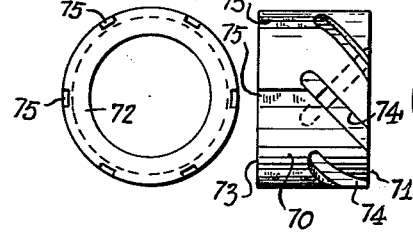
FIG. 14. FIG. 12. FIG. 13.
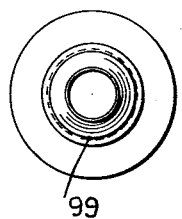
FIG. 16. FIG. 15.
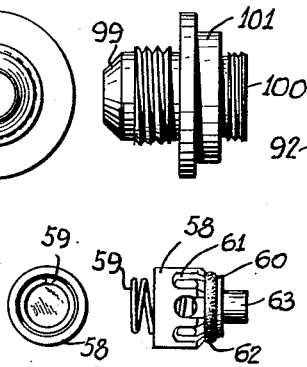
FIG. 17.
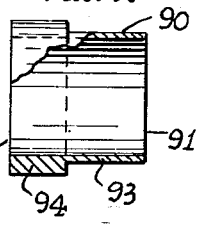
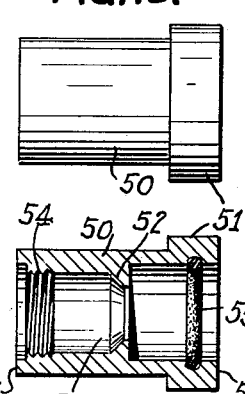
FIG. 18.
FIG. 22. FIG. 21. FIG. 23.
FIG. 20. FIG. 19.
INVENTOR.
EMMERICH WEBER
BY
*Pere Freeman*
ATTORNEY Aug. 27, 1957  E. WEBER  2,804,319
LUGGED CONDUIT COUPLING DEVICE WITH LATCH
SLEEVE MANIPULATOR
Filed Dec. 13, 1954  3 Sheets-Sheet 3
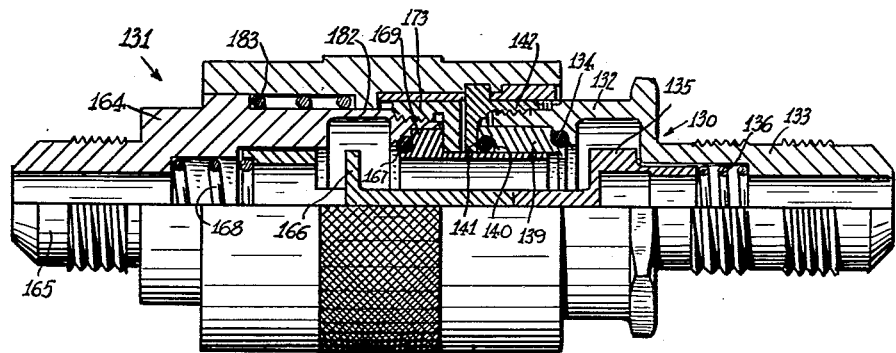
FIG. 24.
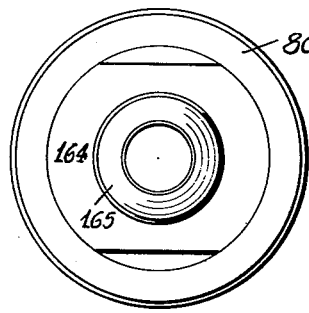
FIG. 25.
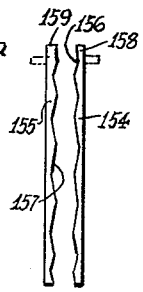
FIG. 27.
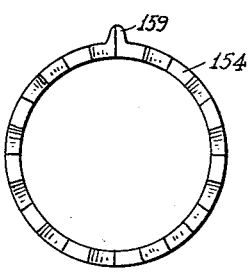
FIG. 28.
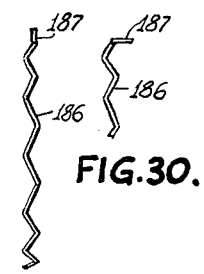
FIG. 30.
FIG. 29.
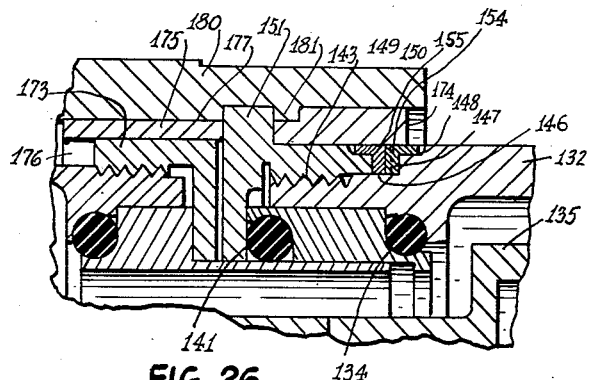
FIG. 26.
INVENTOR.
EMMERICH WEBER.
BY
Percy Freeman
ATTORNEY.

United States Patent Office 2,804,319
Patented Aug. 27, 1957

2,804,319

LUGGED CONDUIT COUPLING DEVICE WITH LATCH SLEEVE MANIPULATOR

Emmerich Weber, Merrick, N. Y., assignor to Weba, Inc., New Hyde Park, N. Y., a corporation of New York Application December 13, 1954, Serial No. 474,735

2 Claims. (Cl. 285—316)

This invention relates generally to coupling devices, and is more particularly directed to a quick-disconnect coupling device.

The particular embodiment of the present invention, which is illustrated in the drawings, and which will be described hereinafter in greater detail, comprises generally a pair of coupling members, one being provided with at least one cam lug and the other having at least one cam slot for receiving the lug when the coupling members are connected, and means for releasably retaining the cam lug of one coupling member in the cam slot of the other.

While there are coupling devices for similar purpose in the prior art, such devices are subject to serious manufacturing and operational difficulties, especially when employed in aircraft hydraulic systems. In such systems, prior coupling devices are primarily unsatisfactory by reason of their excessive weight and size. In addition, prior coupling devices are extremely complex in construction and require numerous intricate parts, many of which are exposed, which renders the devices subject to malfunction, and they are difficult to operate.

Prior devices were subject to another disadvantage in that the existence or otherwise of complete connection between the coupling elements was not discernible or detectable, even by skilled personnel, so that the elements were, at times, only partially connected, which condition was discovered only upon subsequent accidental self-disconnection of the elements.

Accordingly, it is a general object of the present invention to provide a coupling device of the type described which overcomes the above-mentioned difficulties, and which is foolproof in operation, so as to be quickly and easily engageable and disengageable with a minimum of physical exertion and skill.

More particularly, the essential procedure of engaging and disengaging the coupling members of the present invention requires only the simple manipulation of a twist or a pull, which manipulation automatically closes or opens the valves of the coupling members, as required.

Further, the coupling device of the present invention insures full and complete connection between the coupling elements upon engagement of the same, as the coupling elements are either wholly disconnected or completely and positively connected. Moreover, the coupling elements of the instant device cannot be pulled apart by any force on the associated conduit, or by vibration, but only by the specific pull on the outer sleeve intended for such purpose.

It is another object of the present invention to provide a coupling device having the advantageous characteristics mentioned in the foregoing paragraph, and which affords unfailing operation under extreme conditions of vibration and shock, by firmly but releasably holding the coupling members in engagement with each other so that inadvertent or accidental disengagement is effectively prevented.

It is a further object of the present invention to provide a fluid conduit coupling device particularly well adapted for use in aircraft hydraulic systems, pneumatic systems, and fuel systems, which is simple and compact in construction, requiring a minimum of sturdy and relatively small component parts, which is durable and reliable in use, and which can be manufactured and sold at a reasonable cost.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

Fig. 1 is a side view showing a coupling constructed in accordance with the present invention, with the coupling members in engaged or connected condition.

Fig. 2 is an end view showing the engaged coupling of Fig. 1.

Fig. 3 is a longitudinal sectional view showing the engaged coupling of Fig. 1.

Figs. 4, 5 and 6 are similar fragmentary side views showing the coupling of Fig. 1, partly broken away, and illustrating successive stages in the disengagement of the coupling members.

Fig. 7 is a side view showing the coupling of Fig. 1 with the coupling members disengaged or separated from each other.

Fig. 8 is a side view showing one member of the coupling of Fig. 1.

Fig. 9 is an end view showing the coupling member of Fig. 8.

Fig. 10 is a side view, partly in section, showing an outer sleeve or shell adapted for use in the coupling device of the present invention.

Fig. 11 is a sectional view taken substantially along the line 11—11 of Fig. 10.

Fig. 12 is a side view showing an inner sleeve or tubular receiving member of the coupling device, removed therefrom.

Fig. 13 is a view taken from one end of the inner sleeve of Fig. 12.

Fig. 14 is a view taken from the other end of the inner sleeve of Fig. 12.

Fig. 15 is a side view showing a nipple or connection member of the instant coupling device, removed therefrom, and adapted for connecting one coupling member to a fluid conduit or line.

Fig. 16 is an end view of the nipple of Fig. 15.

Fig. 17 is a side elevational view, partly broken away, showing a retaining sleeve of the present coupling device, removed from the latter.

Fig. 18 is a side view showing a valve housing adapted for use in the coupling of the present invention, and removed therefrom.

Fig. 19 is a longitudinal sectional view showing the valve housing of Fig. 18.

Fig. 20 is an end view of the valve housing of Fig. 18.

Fig. 21 is a side elevational view showing a valve member adapted for use in conjunction with the valve housing of Figs. 18–20.

Fig. 22 is a view taken from one end of the valve member of Fig. 21.

Fig. 23 is a view taken from the other end of the valve member of Fig. 21.

Fig. 24 is a side view showing a slightly modified form of coupling constructed in accordance with the present invention, with the coupling members connected together, and partially in section for clarity of understanding.

Fig. 25 is an end view taken from the left of the coupling of Fig. 24.

Fig. 26 is a fragmentary sectional view showing the coupling of Fig. 24 somewhat enlarged.

Fig. 27 is a side view showing a pair of locking rings adapted for use with the coupling of Figs. 24-26, and removed therefrom.

Fig. 28 is a front view of one of the coupling rings of Fig. 27.

Fig. 29 is a side view showing a slightly modified form of locking ring constructed in accordance with the present invention.

Fig. 30 is a partial view showing the locking ring of Fig. 29 with its locking tab bent over.

Referring now more particularly to the drawings, the embodiment of the invention illustrated therein comprises a pair of engageable and disengageable coupling members, generally designated 30 and 31, and best seen in Fig. 7.

The engaging member 30 includes a hollow, generally cylindrical plug member 32 having a pair of opposed, external flats or plano portions 33 for assembly purposes, and having its inner and outer ends closed, respectively, by a face plate 34 and a circumferentially extending disc or securing flange 35. As best seen in Fig. 9, the circumferentially extending flange 35 is provided with a plurality of fastener receiving apertures 36 to mount the coupling member 30 in fixed position.

The face plate 34 defines the inner end of the plug 32, and is provided with at least one, and preferably a plurality of circumferentially spaced, radial cam lugs or projections 37. As seen in the end view of Fig. 9, each lug 37 is a sawtoothed configuration, having one side of greater height than the other. Further, each of the lugs 37 is of generally right triangular configuration when viewed radially or from the side, as in Fig. 8. That is, the inner or front face 40 of each cam lug 37 is substantially coplanar with the inner end of the plug 32, and defines one side of the triangular configuration extending generally circumferentially of the plug. The relatively high side 38 of the cam lug 37 extends longitudinally of the plug axis, generally perpendicular to the inner side 40 and combines with the latter to define the legs of the right triangular configuration. The hypotenuse is formed by an outer, diagonal lug side 41, which converges from the outer end of the lug side 38 to the inner lug side 40, and combines with the latter to define a radially disposed meeting edge 39 of less height than the side 38.

Fixedly secured to the inner face of the plug 32, concentrically thereof, and projecting inwards therefrom, is a generally cylindrical valve housing 45, which encases a spring-pressed valve member 46 (Fig. 9) adapted to open and close the free end of the housing. A tubular conduit connection or nipple 47 is fixedly secured on the outer face of the disc 35 (Figs. 3 and 8), concentrically thereof, and communicates through the plate 35, plug 32 and valve housing 45 when the valve member 46 is open. It is, of course, understood that any suitable valve member 46 and nipple 47 may be employed, it being only necessary that the nipple be adapted for connection to a fluid conduit and communicate through the valve housing 45 upon depression of the valve member into the housing.

The other engaging member 31 includes a valve housing member 50 (Fig. 3) of generally cylindrical external configuration, best seen in Figs. 18-20, and having an external, circumferential enlargement or shoulder 51 adjacent to one end 56. The valve housing 50 has its opposite ends open and is formed medially of its ends with an internal constriction or shoulder 52 having a conical surface 53 facing toward the housing end 57 to serve as a valve seat. Adjacent to the housing end 57, to the left in Fig. 19, there are provided internal screw threads 54, while an annular sealing member or O-ring 55 extends about the interior of the valve housing adjacent to its right hand end 56.

Slidably disposed in the valve housing 50 between the constriction 52 and internal threads 54 is a generally cylindrical, hollow valve member 58 and a coil compression spring 59 disposed within the valve member. The valve member has one end closed and of reduced diameter, as at 60, and is provided with a plurality of circumferentially spaced, through apertures 61 adjacent to its closed end. An annular sealing member or O-ring 62 is circumposed about the closed end 60 of the valve member 58 and engageable with the conical seat 53 of the housing 50 to close the constriction 52. On the closed end 60 of the valve member 58 is an actuating member or stem 63 which projects axially of the valve housing 50 into the space between the constriction 52 and O-ring 55.

An inner sleeve, socket, or receiving member 70 (Figs. 13, 14 and 15), of generally cylindrical configuration, is circumposed about the valve housing 50 and has one end 71 extending beyond the housing end 56. As best seen in Figs. 12-14, the inner sleeve 70 is hollow, having its opposite ends open, and formed with an internal, annular flange 72 on its other end 73. Extending inwards from the end 71 of the sleeve 70, is at least one, and preferably a plurality of angularly disposed cam slots 74 which terminate short of the sleeve end 73. That is, the diagonally extending slots 74 are spaced circumferentially about the inner sleeve 70 and open through the sleeve end 71. In addition, a plurality of longitudinally extending, external grooves or recesses 75, one being associated with each slot 74, are formed in the inner sleeve each having its opposite ends opening into an intermediate portion of the corresponding slot and through the sleeve end 73. The inner sleeve or receiving member 70 is disposed about the enlarged portion or shoulder 51 of the valve housing 50, with the annular flange 72 positioned to abut the shoulder and the sleeve end 71 extending beyond the housing end 56. Hence, the inner sleeve or receiving member 70 cannot be removed from the housing 50 over the shoulder 51.

Circumposed about the inner sleeve or receiving member 70 is an outer sleeve or actuating sleeve or shell 80, also of generally cylindrical configuration, and best seen in Figs. 10 and 11. The outer sleeve 80 has its opposite ends open, as at 81 and 82, and is preferably externally knurled to facilitate manual gripping. Spaced between the shell ends 81 and 82 is formed an internal, annular shoulder or abutment 83. A plurality of internal ribs or retaining elements 84, preferably equal in number to the inner sleeve slots 74, extend longitudinally from the shoulder 83 and terminate in end walls 85 spaced from and facing toward the outer sleeve or shell end 81. The retaining elements or ribs 84 are of a size to slidably engage in the grooves or recesses 75 and have their end walls 85 substantially flat and in alignment with each other circumferentially internally about the outer sleeve. That portion of the shell 80 between the shell end 82 and shoulder 83 is preferably of smaller internal diameter than the ribbed shell portion.

In assembly with the inner sleeve 70, the outer sleeve distance from the shoulder 83 to the sleeve end 81 is preferably, but not necessarily, equal to the length of the inner sleeve, so that the inner sleeve is completely concealed in the position of Fig. 3. More particularly, with the inner sleeve end 73 abutting against the outer sleeve shoulder 83, the inner sleeve end 71 will be contiguous to the outer sleeve end 81. Further, the ribs 84 will be disposed in the recesses 75, respectively, with the rib ends extending across the slots 74 intermediate the ends of the latter. Hence, in the position of Fig. 3, which is also the position of Fig. 4, each rib 84 extends transversely into its associated slot 74 so as to obstruct or close an intermediate portion of the latter. Of course, the outer shell 80 is slidable longitudinally relative to the inner sleeve 70, being constrained by the ribs 84 in the recesses 75, and may be slid leftward from the position of Fig. 3 to withdraw the ribs from their position across the slots 74, as seen in Figs. 5 and 6. In this condition, the inner sleeve 70 is extended relative to the outer sleeve 80, and the slots 74 are unobstructed or open throughout their entire length.

A helical compression spring 88 is disposed snugly within the shell 80 between the shoulder 83 and shell end 82. In order to retain the spring 88 compressed and within the shell 80, a tubular retaining sleeve 90 is inserted into the outer shell end 82 between the spring 88 and valve housing 50. In particular, the retaining sleeve 90 is generally cylindrical or tubular in configuration, and has its opposite ends 91 and 92 open. The sleeve portion 93 adjacent to the end 91 is of relatively thin-walled construction, and inserted between the spring 88 and valve housing 50, while the sleeve portion 94 adjacent to the sleeve end 92 is of relatively heavy or thick construction to define a shoulder closing the space between the valve housing 50 and outer sleeve 80, and extending beyond the outer sleeve end 82.

In order to connect the coupling member 31 to a fluid conduit for communication therewith, a tubular nipple 99 is threadedly engaged in the outer end 57 of the valve housing 50. That is, the tubular nipple or conduit connection member 99 has one end 100 extending into and threadedly secured within the end 57 of the valve housing 50. In this manner, the nipple end 100 engages with the coil spring 59, to hold the latter in compression and maintain the valve member 58 in normally closed condition.

Extending about the tubular nipple 99, intermediate the ends thereof, is an enlarged shoulder or abutment 101 which engages with the valve housing end 57 to limit compression of the spring 59 by the nipple end 100, and also engages with the end 92 of the retaining sleeve 90 to hold the latter in position against the force of the spring 88.

It will now be seen that the valve housing 50 and nipple 99 are rigidly assembled or fixed together, while the outer sleeve or shell 80 is slidable longitudinally on the inner sleeve 70 and retaining sleeve 90 against the force of the spring 88. In addition, the inner sleeve 70 and retaining sleeve 90 may be movable slightly toward and away from each other, if desired, in accordance with the space left between the inner sleeve flange 72 and retaining sleeve end 91, at 104 in Fig. 3. However, it is not essential that any space be left. With the coupling members 30 and 31 in their engaged condition, as shown in Fig. 3, it is, of course, understood that the shank 63 of the valve member 58 engages with the valve member 46 to displace both of the valve members. This, of course, will provide through fluid communication between the nipples 47 and 99.

In normal operation, the coupling member 30 is fixedly secured to an appropriate support by the flange 35, and the coupling member 31 is engaged with the coupling member 30 by merely grasping the shell 80 and manipulating the latter to effect reception of the valve housing 45 through the O-ring 55 of the valve housing 50 and reception of the plug 32 through the end 71 of the inner sleeve or receiving member 70, with the cam lugs 37 received in the slots 74. The inner side or face 40 of each cam lug 37 will then be moved into facing engagement with the end wall 85 of the adjacent rib or retaining element 84. Upon slight rotation of the member 30, the diagonal side 41 of each cam lug will engage with one wall of its associated slot 74, the slot walls serving as cam slots to guide the cam lugs. Continued rotation of the member 30 with the cam lugs in engagement with the rib ends and slot walls, will effect extension of the outer sleeve or shell 80 relative to the inner sleeve 70 in the manner of a worm gear. The ribs 85 will be withdrawn from across the slots 74 to open the latter and permit continued movement of the cam lugs 37 toward the slot ends. As the cam lugs 37 pass the ribs 84, and as the lug faces 40 pass the rib end walls 85, the ribs, and hence, the outer sleeve 80, will be released for longitudinal movement under the force of the spring 88. That is, the inner sleeve 70 will be retracted across the outer sleeve 80 and the ribs 84 moved into the slots 74 (the position of Fig. 4) to retain the coupling members in engagement.

Disengagement of the coupling members 30 and 31 may, of course, be readily accomplished by merely withdrawing the outer shell 80 away from the fixed coupling member 30, the position of Fig. 5. Withdrawal of the outer shell will effect compression of the spring 88 and retraction of the ribs 84 from across the slots 74, whereupon the lugs 37 are free to pass outwards, see Fig. 6, and through the open ends of the slots.

In Figs. 24–28 are shown a slightly modified form of coupling device constructed in accordance with the present invention, and which includes a pair of engageable and disengageable coupling members, generally designated 130 and 131.

The engaging member 130 comprises a hollow, generally cylindrical plug member 132 having its opposite ends open and formed on its outer end with a tubular nipple 133. Mounted in the plug member 132 and nipple 133 for sliding movement between the illustrated open position, and a closed position in engagement with the seal ring 134, is a valve member 135. The valve member 135 is resiliently urged toward its closed position by the helical compression spring 136 disposed in the nipple 133. A cylindrical insert 139 is disposed within the inner end of the plug member 132 for holding the sealing ring 134 in position, and is internally grooved, as at 140, for receiving the O-ring 141.

An annular member or collar 142 is circumposed about the inner end of the plug member 132, and in threaded engagement with the latter at 143 for holding the insert 139 in position within the plug member. As best seen in Fig. 26, the plug member 132 is formed with a reduced, external portion 146 adjacent to the screw threads 143 and defining a rearwardly facing, annular shoulder 147. Further, the plug member 132 is formed with an external recess or notch 148 which opens through the shoulder 147. The outer end 149 of the annular member or collar 142 thus combines with the reduced plug portion 146 and shoulder 147 to form an external annular groove in the coupling member 130. The collar 142 is similarly provided with an external recess or notch 150 which opens outwards through the collar end 149. Projecting radially from the collar 142 are a plurality of circumferentially spaced lugs 151 which correspond in structure and function to the cam lugs 37 of the first described embodiment of the present invention.

In order to prevent loosening or removal of the collar 142 with respect to the plug member 132, as by unscrewing under extreme conditions of shock and vibration, a pair of locking rings 154 and 155 are circumposed about the reduced plug portion 146 between the shoulder 147 and collar end 149. As best seen in Figs. 27 and 28, each of the locking rings 154 and 155 has one face serrated or formed with a plurality of alternately angulated surfaces, as at 156 and 157, respectively. Each of the locking rings 154 and 155 is additionally provided with an initially radial lug or extension, as at 158 and 159, bendable to the dashed line positions.

When the rings 154 and 155 are disposed in the groove defined between the shoulder 147 and collar end 149, with their angulated surfaces 156 and 157 in mating interengagement with each other, the radial extensions 158 and 159 may be bent over (see Fig. 26), into the recesses 148 and 150, to hold the collar 142 non-rotatable with respect to the plug member 132. More specifically, the serrations or angulated surfaces 156 and 157 will interengage with each other to lock the rings 154 and 155 against relative rotation, while the extensions 158 and 159 in the recesses 148 and 150, respectively, lock the plug member and collar to prevent relative rotation therebetween.

In assembling the coupling member 130, the rings 154 and 155 are circumposed about the reduced plug member portion 146 with their extensions 158 and 159 disposed radially. The collar 142 is then threaded onto the plug 132 so that the rings 154 and 155 are held in locking engagement between the shoulder 147 and collar end 149, with the extensions 158 and 159 disposed in registry, respectively, with the recesses 148 and 150. The extensions may then be bent into the recesses to lock the collar in position on the plug member. Of course, one extension, say 158, may be bent into its recess 148 before the rings 154 and 155 are forced into interlocking engagement. The collar 142 is then rotated to lock the rings with the extension 159 adjacent to the recess 150, so that the latter extension may be bent into its recess for locking the collar and plug member against relative rotation.

The other coupling member 131 includes a hollow valve housing 164 having both ends open, and formed on its outer end with a tubular nipple 165 for connection to a fluid conduit or the like. A valve member 166 is axially shiftable within the housing 164 between the open, illustrated position, and a closed position seated against the O-ring 167, the valve member being resiliently urged toward its closed position by a coil compression spring 168. The O-ring 167 may be held in the valve member 164 by a cylindrical or tubular sleeve 169 disposed axially of and extending beyond the inner end of the valve housing 164. An annular securing member 173 is circumposed about the inner end of the valve housing 164 and threadedly engaged with the latter to hold the tubular member 169 fixed relative to the valve housing.

An inner sleeve, socket or receiving member 175, of generally cylindrical configuration, is circumposed about the valve housing 164 and securing member 173, and has one end 174 extending beyond the inner housing end and tubular member 169. The inner sleeve 175 is similar and corresponds to the inner sleeve 70 of the first described form of the present invention, being hollow with its opposite ends open, and preferably formed with an internal annular flange 176 engageable with the annulus 173 to prevent removal of the inner sleeve from the valve housing 164. The sleeve 175 is further formed with a plurality of angularly disposed cam slots or passageways (not shown), which are substantially identical to those of the sleeve 70, and a plurality of longitudinally extending, external grooves or recesses 177, each associated with and opening into an intermediate portion of one angularly disposed slot.

Circumposed about the inner sleeve or receiving member 175 is an open-ended, outer sleeve or actuating shell 180, of generally cylindrical configuration and preferably externally knurled to facilitate manipulation. The outer shell 180 includes a plurality of longitudinally extending, internal ribs or retaining elements 181 each sliding in one of the grooves or recesses 177, and is further formed with an internal annular shoulder 182 which provides an abutment for a coil compression spring 183. That is, the helical spring 183 is circumposed about the valve housing 164 and engages with the actuating shell shoulder 182 to urge the latter shell to its position in which the retaining ribs 181 are disposed across the slots of the inner sleeve. It will be observed that the outer sleeve end 185 extends somewhat beyond the inner sleeve end 174 for a purpose appearing presently.

In operation, the coupling of Figs. 24-28 is substantially the same as that of Figs. 1-23, it being only necessary to engage the cam lugs 181 of the coupling member 130 in the slots of the inner sleeve 175, and effect a slight relative twist between the inner and the outer sleeves 175 and 180, respectively. This slight twist will, by cam action of the lugs 151 disposed in the angular slots of the inner sleeve 180, and bearing against the retaining elements or ribs 181, effect relative extension between the inner sleeve 175 and the outer sleeve 180 and retraction of the retaining elements from across the receiving slots. The cam lugs 151 may then be moved into the receiving slots beyond the recesses 177, and the retaining ribs 181 permitted to close the slots. Disengagement of the coupling members is readily effected by a pull on the outer sleeve 180 so as to remove the retaining members 181 from across the cam lug receiving slots and permit removal of the lugs from the slots.

As best seen in Fig. 26, the extension of the outer sleeve end 185 beyond the inner sleeve end 174 when the outer and inner sleeves are in their normal relation, will further facilitate connection of the coupling members 130 and 131 by providing a self-centering structure. That is, the plug member 132 is centered relative to the coupling member 131 by engagement of the collar 142 within the end 185 of the outer sleeve, so that mere relative rotation of the coupling members is necessary to engage the lugs 151 in the receiving slots of the inner sleeve 175.

A slightly modified locking ring construction is illustrated in Figs. 29 and 30, where an annular member 186, preferably formed of resilient material, is alternately angulated or corrugated throughout its length, and provided with a radial extension 187 corresponding to one of the extensions 158 or 159. In Fig. 30 the annular locking ring 186 is shown with its extension 187 bent transversely. A pair of locking rings 186 may, of course, be substituted for the locking rings 154 and 155, so that the interengaging corrugations of the locking rings will prevent relative rotation between the plug member 132 and collar 142, while the resilient character of the locking rings 186 will serve to further hold the collar 142 firm with respect to the plug member 132 under substantially all conditions of vibration.

From the foregoing, it is seen that the present invention provides a fluid conduit coupling which fully accomplishes its intended objects, and which is well adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

Having thus described my invention, what I claim as new and desire to secure by Letters Patent is:

1. A conduit coupling comprising a first and a second member, each member including a valve housing, the valve housing of the first member having at one end an inner chamber, shoulder means on said end of the valve housing of the first mentioned member, seal means in the chamber, said second member having means receivable in said chamber in fluid sealing relation therewith, an inner sleeve circumposed and freely rotatable about the valve housing of the first mentioned member, shoulder means on said inner sleeve in abutting relation to said first mentioned shoulder means whereby to constrain relative axial movement of said inner sleeve in at least one direction, said inner sleeve extending longitudinally outwardly beyond the chamber carrying end of the valve housing of said first member, means carried by said second member slidably receivable in said longitudinally extending portion of said inner sleeve, said inner sleeve having a plurality of cam slots extending helically inward from said one sleeve end, a plurality of axially extending grooves in said one end of said inner sleeve and intersecting said diagonal slots at their inner end, a similar plurality of cam lugs on said second member and movable into said slots upon reception of said second member in said inner sleeve, an outer sleeve longitudinally slidable but relatively non-rotatable on said inner sleeve, a plurality of retaining elements carried by said outer sleeve internally thereof and movable therewith through said axially extending grooves in said inner sleeve into and out of a position across said slots to obstruct a portion thereof, and resilient means urging said outer sleeve toward its position in which said retaining elements obstruct said slots, said outer sleeve thus being longitudinally slidable relative to said second member with said cam lugs disposed in said slots to shift said outer sleeve and open said slots for continued inward movement of said cam lugs beyond said obstructed slot portion, release of said outer sleeve permitting return thereof under the force of said resilient means to obstruct said slots and lockingly couple said members, said outer sleeve being movable away from said second member to shift said inner sleeve to withdraw the retaining elements from their slot-obstructing position for withdrawing said cam lugs and uncoupling said members.

2. A fluid conduit coupling according to claim 1, said retaining elements comprising a plurality of longitudinally extending internal ribs on said outer sleeve and slidable in said inner sleeve to constrain said inner and outer sleeves to longitudinal relative movement.

References Cited in the file of this patent

UNITED STATES PATENTS

| | | |
|---|---|---|
| 1,871,370 | Jacques | Aug. 9, 1932 |
| 2,648,553 | Ulrich | Aug. 11, 1953 |